US010100782B2

(12) United States Patent
Lucka et al.

(10) Patent No.: US 10,100,782 B2
(45) Date of Patent: Oct. 16, 2018

(54) SYSTEMS AND METHODS FOR VEHICLE EVAPORATIVE EMISSIONS SYSTEM DIAGNOSTICS

(71) Applicant: Ford Global Technologies, LLC, Dearborn, MI (US)

(72) Inventors: Kevin Lucka, Southfield, MI (US); Dennis Seung-Man Yang, Canton, MI (US); Aed M. Dudar, Canton, MI (US); Mohammad R. Aghili, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 15/169,915

(22) Filed: Jun. 1, 2016

(65) Prior Publication Data
US 2017/0350351 A1 Dec. 7, 2017

(51) Int. Cl.
*F02M 25/08* (2006.01)
*F02D 41/00* (2006.01)
*F02D 41/22* (2006.01)
*F04B 35/00* (2006.01)
*F04B 39/12* (2006.01)
*F04B 53/14* (2006.01)
*G01M 3/02* (2006.01)
*G01M 3/26* (2006.01)

(52) U.S. Cl.
CPC ....... *F02M 25/0818* (2013.01); *F02D 41/003* (2013.01); *F02D 41/22* (2013.01); *F02M 25/089* (2013.01); *F02M 25/0836* (2013.01); *F02M 25/0854* (2013.01); *F04B 35/008* (2013.01); *F04B 39/12* (2013.01); *F04B 53/14* (2013.01); *G01M 3/025* (2013.01); *G01M 3/26* (2013.01); *F02D 2041/225* (2013.01)

(58) Field of Classification Search
None
See application file for complete search history.

(56) References Cited

U.S. PATENT DOCUMENTS 5,193,262 A 3/1993 Hyde et al.
6,321,727 B1 11/2001 Reddy et al.
(Continued)

OTHER PUBLICATIONS

Dudar, Aed M., "Methods ans System for an Evaporative Emissions System Leak Test Using an External Pressure Source," U.S. Appl. No. 14/799,742, filed Jul. 15, 2015, 44 pages.
(Continued)

*Primary Examiner* — Manish S Shah
*Assistant Examiner* — Jean Morello
(74) *Attorney, Agent, or Firm* — Julia Voutyras; McCoy Russell LLP

(57) ABSTRACT

Methods and systems are provided for conducting a diagnostic routine of the fuel vapor system using pressure generated by raising or lowering a vehicle body element such as a hood or a trunk. In one example, by utilizing lift gate cylinders coupled to the hood or trunk, during raising a hood or trunk, the fuel vapor system may be evacuated and during lowering the hood or trunk, the fuel vapor system may be pressurized. A change in vacuum or higher pressure in the fuel vapor system may be monitored over a time period to detect any undesirable evaporative emissions from the fuel vapor system.

20 Claims, 6 Drawing Sheets

(56) References Cited

U.S. PATENT DOCUMENTS

| | | |
|---|---|---|
| 6,401,961 B1 | 6/2002 | Butler |
| 6,595,570 B2 | 7/2003 | Susko |
| 7,140,235 B2 | 11/2006 | McLain et al. |
| 8,074,627 B2 | 12/2011 | Siddiqui |
| 8,410,918 B1 | 4/2013 | Stroud |
| 9,140,627 B2 | 9/2015 | Dudar et al. |
| 2003/0061864 A1 | 4/2003 | Wong et al. |
| 2006/0060401 A1 | 3/2006 | Bole |
| 2014/0074385 A1 | 3/2014 | Dudar et al. |
| 2014/0316638 A1 | 10/2014 | Dudar et al. |
| 2015/0090006 A1 | 4/2015 | Peters et al. |
| 2015/0120133 A1* | 4/2015 | Dudar .................. F02M 65/00 701/34.4 |

OTHER PUBLICATIONS

Dudar, Aed M., "Evaporative Emissions Testing Using Inductive Heating," U.S. Appl. No. 14/866,305, filed Sep. 25, 2015, 59 pages.

Dudar, Aed M. et al., "Evaporative Emission Detection Method with Vehicle Self Leveling Suspension Compensation," U.S. Appl. No. 14/933,611, filed Nov. 5, 2015, 61 pages.

Dudar, Aed M. et al., "Convection Heating Assisted Engine-Off Natural Vacuum Test," U.S. Appl. No. 15/016,061, filed Feb. 4, 2016, 76 pages.

* cited by examiner

SYSTEMS AND METHODS FOR VEHICLE EVAPORATIVE EMISSIONS SYSTEM DIAGNOSTICS

FIELD

The present description relates generally to methods and systems for actively pressurizing or evacuating a vehicle evaporative emissions control system and fuel system to test for the presence of undesired evaporative emissions.

BACKGROUND/SUMMARY

Vehicle evaporative emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of undesired evaporative emissions that could release fuel vapors to the atmosphere.

Undesired evaporative emissions may be identified using engine-off natural vacuum (EONV) during conditions when a vehicle engine is not operating. In particular, a fuel system and evaporative emissions control system may be isolated at an engine-off event. The pressure in such a fuel system and evaporative emissions control system will increase if the tank is heated further (e.g., from hot exhaust or a hot parking surface) as liquid fuel vaporizes. If the pressure rise meets or exceeds a predetermined threshold, it may be indicated that the fuel system and the evaporative emissions control system are free from undesired evaporative emissions. Alternatively, if during the pressure rise portion of the test the pressure curve reaches a zero-slope prior to reaching the threshold, as fuel in the fuel tank cools, a vacuum is generated in the fuel system and evaporative emissions system as fuel vapors condense to liquid fuel. Vacuum generation is monitored and undesired emissions identified based on expected vacuum development or expected rates of vacuum development. The EONV test may be monitored for a period of time based on available battery charge.

However, the EONV test is prone to false failures based on customer driving and parking habits. For example, a refueling event that fills the fuel tank with relatively cool liquid fuel followed by a short ensuing trip may fail to heat the fuel bulk mass and may result in a false fail if an EONV test is run. Further, the rates of pressure build and vacuum development are based in part on the ambient temperature. During mild weather conditions, the ambient temperature may restrict the amount of heating or cooling of the fuel tank following engine shut-off, and thus limit the rate of pressure or vacuum development. As such, in a case wherein a pressure build does not reach the expected threshold, the subsequent vacuum build may additionally not reach expected threshold level in the time allotted for the EONV test based on available battery charge. This may result in a false-fail condition, leading to potentially unnecessary engine service. Given the above-described issues with relying on EONV tests to diagnose vehicle fuel system and/or evaporative emissions systems, alternate approaches have been developed.

In one example, US Patent Application 2015/0090006 A1 teaches conducting leak detection in an evaporative emission systems control system by using a pump configured to both pressurize and evacuate the fuel system. However, the inventors herein have recognized potential issues with such a method. For example, the use of an external pump introduces additional costs, occupies additional space in the vehicle, and includes the potential for malfunction.

In another example, US Patent Application 20140074385 teaches, during engine-off conditions, operating a fuel pump coupled to the fuel tank to initiate an evaporative emissions test. By operating the fuel pump, fuel in the fuel tank is agitated, causing a fuel vapor pressure to increase. Following the fuel tank pressure build-up, pump operation is discontinued, and a rate of pressure decay or bleed-down is monitored and compared to a threshold rate. However, the inventors have additionally recognized a potential issue with such a method. For example, increasing fuel vapor pressure may in some examples result in fuel vapors being routed to a fuel vapor canister positioned in the evaporative emissions system. Fuel vapors routed to the canister may increase the loading state of the canister, which may in some cases lead to an increase in bleed emissions from the canister depending on the adsorbent capacity of the canister.

In yet another example, U.S. Pat. No. 9,140,627 teaches, during a vacuum portion of an EONV test, operating a cooling fan to increase a fuel system vacuum, and indicating the presence or absence of undesired evaporative emissions based on the increased vacuum. However, the inventors have further recognized a potential issue with such a method. For example, while the method may serve to facilitate an increased level of vacuum during the vacuum build portion of an EONV test, the portion of the EONV test wherein a pressure build is monitored is not able to be manipulated by such a method.

The inventors herein have recognized the above issues, and developed systems and methods to at least partially address the problems. One example method for an engine comprises: adjusting pressure in a vehicle evaporative emissions system by raising or lowering a vehicle body element; and conducting a test in the evaporative emissions control system for detection of evaporative emissions based on the adjusted pressure. In this way, by generating vacuum and/or pressure in the evaporative emissions control system using body component lifting, for example through lift gate cylinders, undesired evaporative emissions may be detected.

In one example, the vehicle system may comprise a body element such as a hood, a trunk, and/or a gull wing style door which may be raised and lowered based on operator demand. Pneumatic or screw motor cylinders may be present in the vehicle lift gate which may be used to draw in ambient air via an orifice. During raising of the hood or trunk, a canister vent valve of an engine evaporative emissions control system may be closed and a lift gate valve coupling the body element to the evaporative emissions control system may be opened such that the lift gate cylinders may draw out air from the fuel vapor system, creating a vacuum therein. Once a sufficient level of vacuum has built in the fuel vapor system, the fuel vapor system may be sealed and bleed-down of vacuum may be observed over a defined period of time. If the rate of vacuum decay is higher than an expected rate, it may be inferred that undesired evaporative emissions may be present. If the vehicle hood or trunk is lowered during the test, the lift gate valve may have to be re-opened, the current diagnostic test may be terminated, and the fuel vapor system may be vented. Along with the lift gate valve, the canister vent valve may be opened to facilitate the venting process and may be subsequently closed within a short time while the hood or trunk is still in the process of being lowered. The closing of the lift gate valve and the opening and closing of the canister vent valve may cause air to be compressed into the fuel vapor system, thereby creating a higher pressure in the fuel vapor system. The higher pressure may then be used for a further diagnostic routine to detect any undesired emissions in the evaporative emissions control system. If the rate of higher pressure decay is higher than expected, it may be inferred undesired evaporative emissions are present in the system.

In this way, a cylinder coupled to a vehicle body element such as a hood, or a trunk may be used to apply vacuum and/or positive pressure in a fuel vapor system. By using this vacuum and/or higher pressure generated by the lift gate cylinders, detection of undesired emissions in the evaporative emissions control system may be opportunistically carried out without dependence on ambient temperature and duration of engine key-off. In addition, the need of dedicated vacuum/positive pressure pumps for providing the pressure is reduced. The technical effect of using lift gate cylinders coupled to a vehicle hood or trunk for evaporative emissions control system diagnostic test is that the test may be carried out both during raising of the hood or trunk (using the vacuum generated in the process) and during lowering of the hood or trunk (using the positive pressure generated in the process). By coupling the lift gate cylinders directly to a vent line of the fuel vapor system, a time required for attaining the desired vacuum or higher pressure may be lowered and an evaporative emissions control system diagnostic test may be carried out within a short time of engine operation, such as in the limited engine-on time of a hybrid vehicle. As a result, a larger number of diagnostics tests may be carried out within a drive cycle, improving the completion ratio for the evaporative emissions control system monitoring. Therefore, by using a lift gate cylinder for evaporative emissions control system diagnostics, engine emissions compliance may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
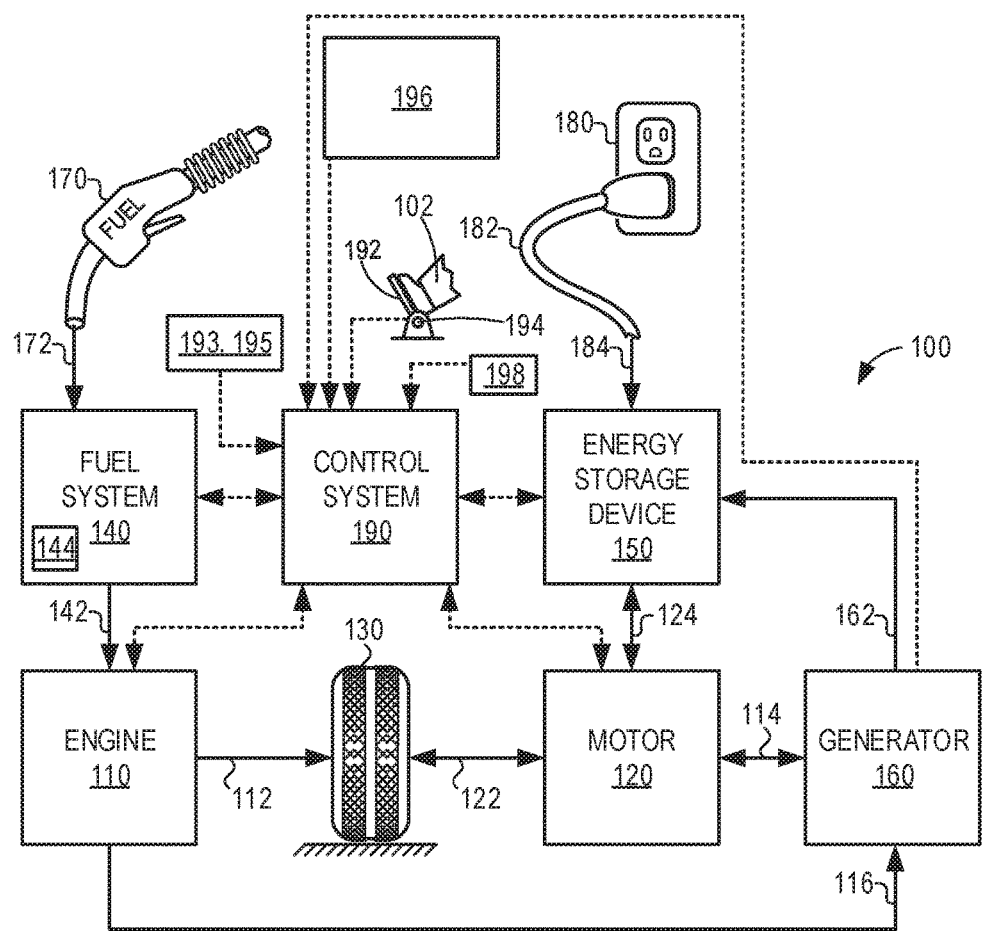
FIG. 1 shows a schematic diagram of an example vehicle propulsion system.
Figure 2:
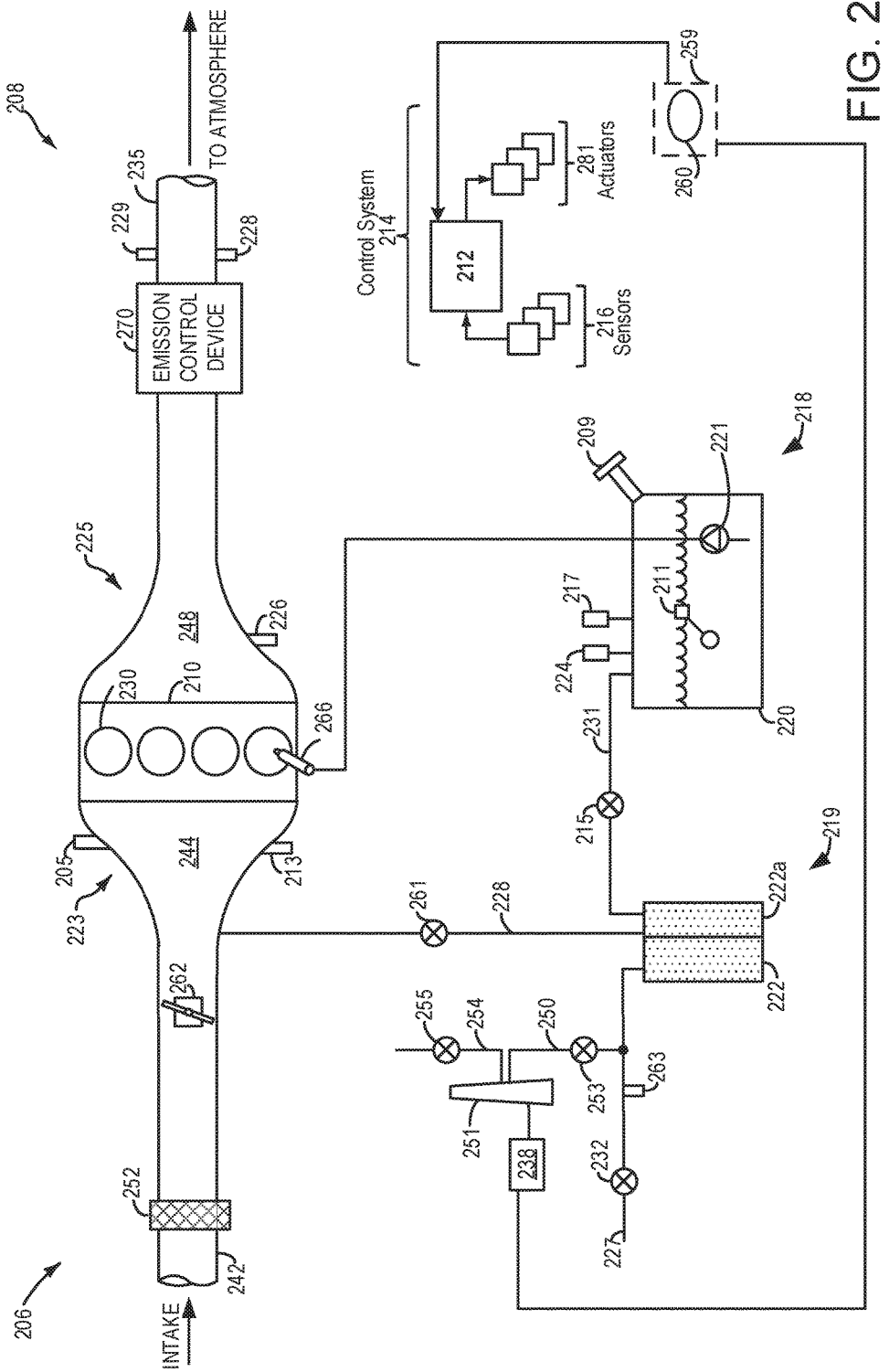
FIG. 2 shows a schematic diagram of a vehicle engine system including an evaporative emissions control system.
Figure 3:
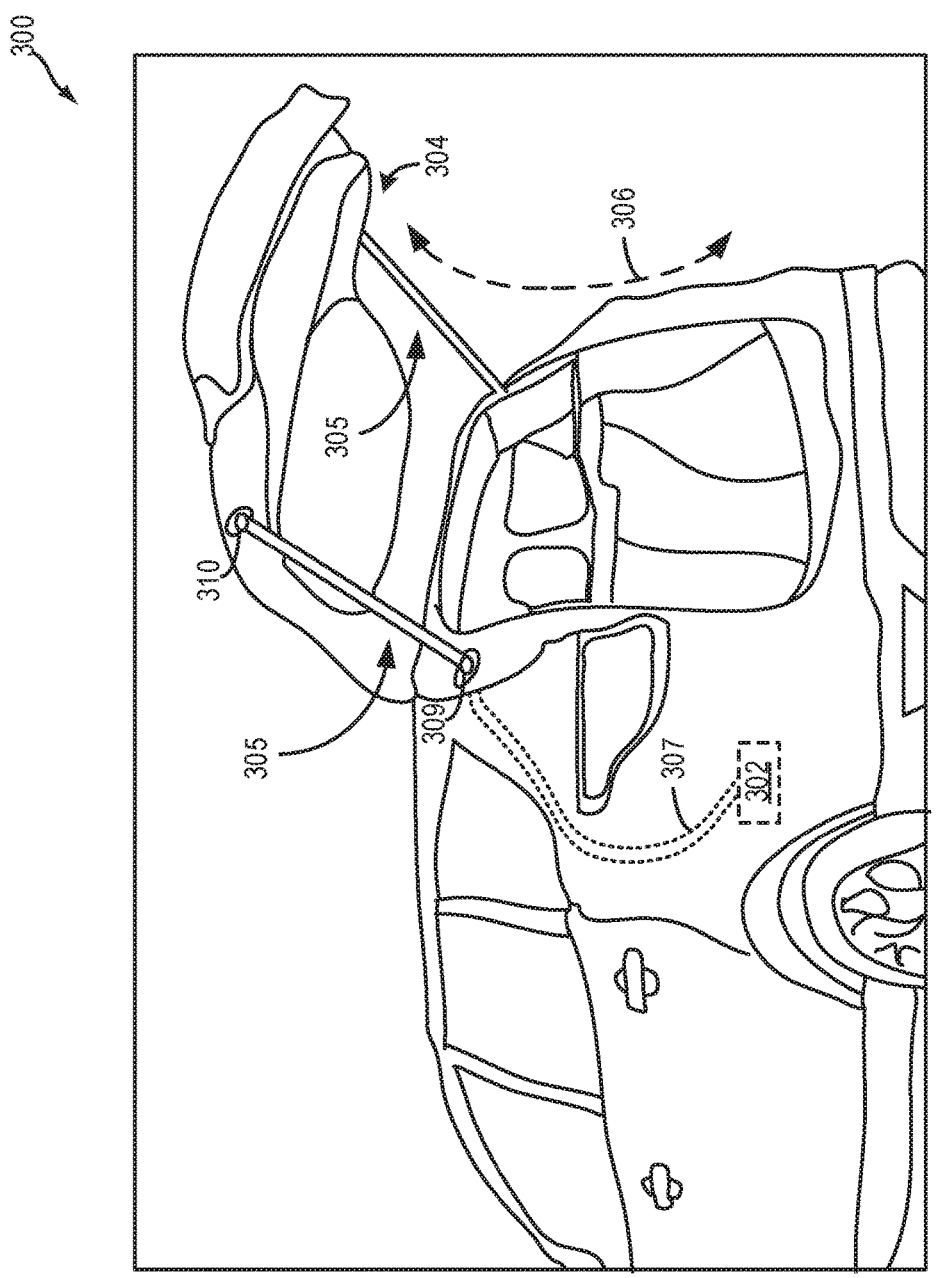
FIG. 3 shows example lift gate cylinders in a vehicle trunk.

The following description relates to systems and methods for using vacuum and higher pressure generated via lift gate cylinders for diagnostics of an evaporative emissions control system. An example vehicle system with an engine and an electric motor is shown in FIG. 1 and a detailed description of the engine system comprising an evaporative emissions control system and fuel system is shown in FIG. 2. An example of lift gate cylinders coupled to a vehicle trunk used for the evaporative emissions control system diagnostics is shown in FIG. 3. An engine controller may be configured to perform a control routine, such as the example routines of FIGS. 4 and 5 for carrying out the evaporative emissions control system diagnostic tests during opening and subsequent closing of a vehicle body element such as a hood or a trunk, using lift gate cylinders. An example of the diagnostics routine is shown with reference to FIG. 6.

Turning now to the figures, FIG. 1 illustrates an example vehicle propulsion system 100. For example, vehicle system 100 may be a hybrid electric vehicle or a plug-in hybrid electric vehicle. However, it should be understood that, though FIG. 1 shows a hybrid vehicle system, in other examples, vehicle system 100 may not be a hybrid vehicle system and may be propelled solely via engine 110.

Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV). While FIG. 1 depicts a HEV, the description is not meant to be limiting and it may be understood that the systems and methods depicted herein may be applied to non-HEVs without departing from the scope of the present disclosure.

In some examples, vehicle propulsion system 100 may utilize a variety of different operational modes depending on operating conditions encountered by the vehicle propulsion system. Some of these modes may enable engine 110 to be maintained in an off state (set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. An evaporative emissions system (herein also referred to as a fuel vapor system) may be coupled to the fuel system 140. A detailed description of the fuel system with the associated evaporative emissions system will be discussed in relation to FIG. 2. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, generator 160, an onboard global positioning system (GPS) 193, and onboard cameras 195. Further, control system 190 may send control signals to one or more of engine 110, motor 120, fuel system 140, energy storage device 150, generator 160, and onboard cameras 195, responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient condition sensor 198 such as for estimating ambient temperature or ambient humidity. The vehicle instrument panel 196 may include indicator light(s) and/or a text-based display in which messages are displayed to an operator. The vehicle instrument panel 196 may also include various input portions for receiving an operator input, such as buttons, dials, touch screens, voice input/recognition, etc. In an alternative embodiment, the vehicle instrument panel 196 may communicate audio messages to the operator without display. These devices may be connected to control system 190.

FIG. 2 shows a schematic depiction of an engine system 208. The engine system may be a part of a hybrid vehicle system 206 which may also include a battery system, (not shown). In one example, engine system 208 may be the engine system 110 as seen in FIG. 1. An energy conversion device, such as a generator (not shown), may be operated to absorb energy from vehicle motion and/or engine operation, and then convert the absorbed energy to an energy form suitable for storage by the energy storage device.

Engine system 208 may include an engine 210 having a plurality of cylinders 230. Engine 210 includes an engine intake 223 and an engine exhaust 225. Engine intake 223 includes an air intake throttle 262 fluidly coupled to the engine intake manifold 244 via an intake passage 242. Air may enter intake passage 242 via air filter 252. Engine exhaust 225 includes an exhaust manifold 248 leading to an exhaust passage 235 that routes exhaust gas to the atmosphere. Engine exhaust 225 may include one or more emission control devices 270 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated herein. In some embodiments, wherein engine system 208 is a boosted engine system, the engine system may further include a boosting device, such as a turbocharger (not shown).

Engine system 208 is coupled to a fuel system 218, and evaporative emissions system 219 (herein also referred to as a fuel vapor system). Fuel system 218 includes a fuel tank 220 coupled to a fuel pump 221, the fuel tank supplying fuel to an engine 210 which propels a vehicle. Evaporative emissions system 219 includes fuel vapor canister 222. During a fuel tank refueling event, fuel may be pumped into the vehicle from an external source through refueling port 209. Fuel tank 220 may hold a plurality of fuel blends, including fuel with a range of alcohol concentrations, such as various gasoline-ethanol blends, including E10, E85, gasoline, etc., and combinations thereof. A fuel level sensor 211 located in fuel tank 220 may provide an indication of the fuel level ("Fuel Level Input") to controller 212. As depicted, fuel level sensor 211 may comprise a float connected to a variable resistor. Alternatively, other types of fuel level sensors may be used.

Fuel pump 221 is configured to pressurize fuel delivered to the injectors of engine 210, such as example injector 266. While only a single injector 266 is shown, additional injectors are provided for each cylinder. It will be appreciated that fuel system 218 may be a return-less fuel system, a return fuel system, or various other types of fuel system. Vapors generated in fuel tank 220 may be routed to fuel vapor canister 222, via conduit 231, before being purged to the engine intake 223.

Fuel vapor canister 222 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 222 may be purged to engine intake 223 by opening canister purge valve 261. While a single canister 222 is shown, it will be appreciated that fuel system 218 may include any number of canisters. In one example, canister purge valve 261 may be a solenoid valve wherein opening or closing of the valve is performed via actuation of a canister purge solenoid.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 222 includes a vent line 227 for routing gases out of the canister 222 to the atmosphere when storing, or trapping, fuel vapors from fuel tank 220. Vent line 227 may also allow fresh air to be drawn into fuel vapor canister 222 when purging stored fuel vapors to engine intake 223 via purge line 228 and purge valve 261. While this example shows vent line 227 communicating with fresh, unheated air, various modifications may also be used. Vent line 227 may include a canister vent valve 232 to adjust a flow of air and vapors between canister 222 and the atmosphere. A pressure sensor 263 may be coupled to the vent line 227.

One or more lift gate cylinders 251 may be coupled to the vent line 227 via a first line 250. The lift gate cylinders 251 may be one of pneumatic and screw motor cylinders and may be part of a vehicle body element 238 such as a hood, a trunk, and/or a gull wing style door (that opens vertically). A first lift gate valve 253 may be coupled to the first line 250 to regulate airflow between the vent line 227 and the lift gate cylinders 251. Optionally, a second line 254 may couple the lift gate cylinders 251 directly to the atmosphere via a second lift gate valve 255. In one example, each of the canister vent valve 232, the first lift gate valve 253, and the second lift gate valve 255 may be solenoid valves wherein opening or closing of the valve is performed via actuation of the respective vent solenoids. The lift gate cylinders may be used for performing diagnostic routines on the evaporative emissions system 219.

In one example, when the vehicle hood or trunk 238 is raised or lowered responsive to operator input, the first valve 253 may be opened to establish fluidic communication between the cylinders 251 and the evaporative emissions system 219 and the second valve 255 may be closed to isolate the cylinders from the atmosphere. In addition, the canister purge valve 261 may also be closed to seal the fuel vapor system.

The vehicle hood or trunk 238 may be operated (raised and lowered) via operator actuation of a switch 260 coupled to the dashboard 259 of the vehicle. During raising of the hood or trunk 238, the cylinders 251 draw in air from different components of the evaporative emissions system 219 including the canister 222, and the lines 227, 228, and 231, thereby creating a vacuum in the fuel vapor system (evaporative emissions system 219 and fuel system 218 combined). Once the vacuum reaches a predetermined level, the first lift gate valve 232 may be closed and the decrease in vacuum may be observed in the fuel vapor system over a threshold period of time. In alternate examples, vacuum may be developed while the hood or trunk 238 is raised and the first lift gate valve 232 may be closed once the hood or trunk 238 has been raised to a final position. Thereafter a rate of vacuum bleed-up may be monitored. If the vacuum (negative pressure) holds below a threshold pressure level for a duration following the closing of the first lift gate valve, it may be inferred that there are no undesired evaporative emissions from the fuel vapor system and that the integrity of the fuel vapor system has not been breached. If lowering of the hood or trunk 238 is initiated while the vacuum-based diagnostics are being run (and before they are completed), the incomplete diagnostics may be terminated and a new diagnostics test using positive pressure generated in the fuel vapor system via the cylinders 251 during the lowering, may be initiated.

In response to initiation of lowering of the vehicle hood or trunk 238, the first lift gate valve 253 may first be opened for venting the cylinders 251. In the process, the fuel vapor system vacuum may also be vented. During this time the canister vent valve 232 may also be transiently opened to facilitate venting of the earlier generated vacuum from the fuel vapor system. The canister vent valve 253 may then be closed while the lift gate is still in the process of closing and the hood or trunk 238 is still in the process of lowering. This transient opening followed by the closing of the canister vent valve 232 may force air out of the lift gate into the fuel vapor system, specifically compressing the air entering the fuel vapor system from the cylinders 251, thereby creating a higher (positive) pressure in the fuel vapor system. The fuel vapor system may again be isolated by closing each of the canister vent valve 232, and the canister purge valve 261, and this higher positive pressure, may then be monitored and if the pressure does not decay to below a threshold level within a pre-determined time period, it may be inferred there are no undesired evaporative emissions from the fuel vapor system.

In another example, during evaporative emissions system 219 diagnostic using vacuum generated from the lift gate cylinders 251, in response to lowering of the hood or trunk 238, the first lift gate valve 253 may continue to be maintained in the closed position while the second valve 255 may be actuated to an open position to vent the cylinders 251. Therefore, the diagnostics of the evaporative emissions system 219 may not be interrupted due to lowering of the hood or trunk 238. In this way, lift gate cylinders 251 may be effectively used to generate vacuum and higher pressure in the evaporative emissions system 219 which may be used for diagnostics of the system.

The vent valve 232 may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve 232 may be opened to allow a flow of fresh air to strip the fuel vapors stored in the canister.

Hybrid vehicle system 206 may have reduced engine operation times due to the vehicle being powered by engine system 208 during some conditions, and by the energy storage device under other conditions. While the reduced engine operation times reduce overall carbon emissions from the vehicle, they may also lead to insufficient purging of fuel vapors from the vehicle's emission control system. To address this, in one example a fuel tank isolation valve 215 may be optionally included in conduit 231 such that fuel tank 220 is coupled to canister 222 via the valve. During regular engine operation, isolation valve 215 may be kept closed to limit the amount of diurnal or "running loss" vapors directed to canister 222 from fuel tank 220. During refueling operations, isolation valve 215 may be temporarily opened, e.g., for a duration, to direct fuel vapors from the fuel tank 220 to canister 222. By opening the valve during refueling operations when the fuel tank pressure is higher than a threshold (e.g., above a mechanical pressure limit of the fuel tank), the refueling vapors may be released into the canister and the fuel tank pressure may be maintained below pressure limits. While the depicted example shows isolation valve 215 positioned along conduit 231, in alternate embodiments, the isolation valve may be mounted on fuel tank 220. In other examples, a fuel tank isolation valve may not be included in the vehicle.

One or more pressure sensors 217 may be coupled to fuel system 218 for providing an estimate of a fuel system (and evaporative emissions system) pressure. In one example, the fuel system pressure, and further the evaporative emissions system pressure, may be indicated by pressure sensor 217, where pressure sensor 217 is a fuel tank pressure transducer (FTPT) coupled to fuel tank 220. While the depicted example shows pressure sensor 217 directly coupled to fuel tank 220, in alternate embodiments, the pressure sensor may be coupled between the fuel tank and canister 222, for example between the fuel tank and isolation valve 215 (if included). In still other embodiments comprising a fuel tank isolation valve, a first pressure sensor may be positioned upstream of the isolation valve (between the isolation valve and the canister), while a second pressure sensor may be positioned downstream of the isolation valve (between the isolation valve and the fuel tank), to provide an estimate of a pressure difference across the valve. In some examples, a vehicle control system may infer and indicate undesired evaporative emissions based on changes in a fuel tank (and evaporative emissions system) pressure during an evaporative emissions diagnostic routine. In another example, the control system may utilize pressure sensor 263 coupled to the canister vent line during such a diagnostic routine.

One or more temperature sensors 224 may also be coupled to fuel system 218 for providing an estimate of a fuel system temperature. In one example, the fuel system temperature is a fuel tank temperature, wherein temperature sensor 224 is a fuel tank temperature sensor coupled to fuel tank 220 for estimating the fuel tank temperature. While the depicted example shows temperature sensor 224 directly coupled to fuel tank 220, in alternate embodiments, the temperature sensor may be coupled between the fuel tank and canister 222, for example.

Fuel vapors released from canister 222, for example during a purging operation, may be directed into engine intake manifold 244 via purge line 228. The flow of vapors along purge line 228 may be regulated by canister purge valve 261, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 212, responsive to engine operating conditions, including, for example, engine speed-load conditions, an air-fuel ratio, a canister load, etc. By commanding the canister purge valve to be closed, the controller may seal the fuel vapor system (evaporative emissions control system) from the engine intake. An optional canister check valve (not shown) may be included in purge line 228 to hinder intake manifold pressure from flowing gases in the opposite direction of the purge flow. As such, the check valve may be necessary if the canister purge valve control is not accurately timed or the canister purge valve itself can be forced open by a high intake manifold pressure.

The engine intake may include various sensors. For example, a mass air flow (MAF) sensor 205 may be coupled to the engine intake to determine a rate of air mass flowing through the intake. Further, a barometric pressure sensor 213 may be included in the engine intake. For example, barometric pressure sensor 213 may be a manifold air pressure (MAP) sensor and may be coupled to the engine intake downstream of throttle 262. During some conditions, barometric pressure sensor 213 may be used to determine BP changes, e.g., due to altitude changes of the vehicle. However, barometric pressure sensor 213 may rely on part throttle or full or wide open throttle conditions, e.g., when an opening amount of throttle 262 is greater than a threshold, in order to accurately determine BP. Thus, during closed throttle conditions, e.g., when an opening amount of throttle 262 is less than the threshold, the sensor may not be able to be used to infer BP. During such conditions, one or more tire pressure sensors may be used to determine BP changes as described in more detail below.

Fuel system 218 and evaporative emissions system 219 may be operated by controller 212 in a plurality of modes by selective adjustment of the various valves and solenoids. For example, the fuel system and evaporative emissions system may be operated in a fuel vapor storage mode (e.g., during a fuel tank refueling operation and with the engine not running), wherein the controller 212 may open isolation valve 215 (if included) and canister vent valve 232 while closing canister purge valve (CPV) 261 to direct refueling vapors into canister 222 while hindering fuel vapors from being directed into the intake manifold.

As another example, the fuel system and evaporative emissions system may be operated in a refueling mode (e.g., when fuel tank refueling is requested by a vehicle operator), wherein the controller 212 may open isolation valve 215 (if included) and canister vent valve 232, while maintaining canister purge valve 261 closed, to depressurize the fuel tank before enabling fuel to be added therein. As such, isolation valve 215 (if included) may be kept open during the refueling operation to allow refueling vapors to be stored in the canister. After refueling is completed, the isolation valve (if included) may be closed.

As yet another example, the fuel system and evaporative emissions system may be operated in a canister purging mode (e.g., after an emission control device light-off temperature has been attained and with the engine running), wherein the controller 212 may open canister purge valve 261 and canister vent valve 232 while closing isolation valve 215 (if included). Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 222 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

As a yet further example, the fuel system and evaporative emissions system may be operated in an evaporative emission diagnostic mode. In a first diagnostic mode, during the raising of the vehicle hood or trunk, the controller 212 may close each of the canister vent valve 232, the canister purge valve 261, and the second lift gate valve 255, and open the first lift gate valve 253 in order to generate a vacuum (lower pressure) in the evaporative emissions system. Once the vacuum generated from the lift gate cylinders at the evaporative emissions reaches a first threshold value, the first lift gate valve 253 may be closed and the rise in pressure in the evaporative emissions system may be monitored over a pre-determined period of time for detection of any undesired evaporative emissions. In a second diagnostic mode, during the lowering of the vehicle hood or trunk, the controller 212 may open each of the canister vent valve 232, and the first lift gate valve 253, while maintaining the canister purge valve 261 and the second lift gate valve 255 in closed positions. Once the evaporative emissions system pressure increases to a second threshold level (atmospheric pressure), the canister vent valve 232 may be actuated to a closed position in order to generate a higher positive pressure in the evaporative emissions system via the lift gate cylinders. Once the higher pressure at the evaporative emissions reaches a third threshold value, the first lift gate valve 253 may be closed and the drop in pressure in the evaporative emissions system may be monitored over a pre-determined period of time to detect of any undesired evaporative emissions.

Vehicle system 206 may further include control system 214. Control system 214 is shown receiving information from a plurality of sensors 216 (various examples of which are described herein) and sending control signals to a plurality of actuators 281 (various examples of which are described herein). As one example, sensors 216 may include evaporative emissions system pressure sensor 263, a cabin occupancy sensor coupled to a vehicle passenger cabin, exhaust gas sensor 226 located upstream of the emission control device, temperature sensor 224, MAP sensor 213, fuel tank pressure sensor 217. Other sensors such as additional pressure, temperature, air/fuel ratio, and composition sensors may be coupled to various locations in the vehicle system 206. Also, the control system 214 may receive inputs from the lift gate operation switch 260 to actuate a vehicle body element such as a hood or a trunk. As another example, the actuators may include fuel injector 266, isolation valve 215 (if included), canister purge valve 261, canister vent valve 232, first lift gate first valve 253, and second lift gate valve 255, fuel pump 221, and throttle 262.

The control system 214 may include a controller 212. Controller 212 may be configured as a conventional microcomputer including a microprocessor unit, input/output ports, read-only memory, random access memory, keep alive memory, a controller area network (CAN) bus, etc. Controller 212 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. In one example, the controller may receive inputs from the lift gate operation switch 260 and in response to raising or lowering events of a vehicle body element, may opportunistically perform a diagnostic routine of the evaporative emissions system 219. Further, the controller may receive input from occupancy sensors coupled to a vehicle cabin indicative of vehicle occupancy and may initiate the initiation of the diagnostic routine upon confirmation that the vehicle cabin is unoccupied. Example control routines describing evaporative emissions system 219 diagnostics is discussed herein with regard to FIGS. 4 and 5.

FIG. 3 shows an example vehicle 300 with lift gate cylinders 305 coupled to the doors of a vehicle body element such as a vehicle trunk. It will be appreciated that a similar arrangement may be provided at the vehicle hood. Raising or lowering the vehicle trunk door 304 includes actuating one or more lift gate cylinders 305, the one or more lift gate cylinders 305 coupling a body of the vehicle to the vehicle trunk 300, the one or more lift gate cylinders further coupled to the evaporative emissions system 302 (such as 219 of FIG. 2) via a hose 307. The hose 307 may be coupled to a vent line (such as vent line 227 of FIG. 2) of the emissions system 302 via a lift gate valve (such as valve 253 of FIG. 2). The opening of the lift gate valve may be adjusted to regulate air flow between the lift gate cylinders 305 and the evaporative emissions system 302.

The lift gate cylinders may be used to facilitate smooth operation of the door 304 of the trunk. In one example, the cylinders 305 may be pneumatically operated and in another example, the cylinders 305 may be screw motor cylinders. Further, each of the cylinders 305 may be a part of a gas pressure spring system which may further comprise one or more movable pistons. One end of each piston may be coupled to the vehicle body via a bearing 310, while the other end of the piston may laterally move along the inner surface of a corresponding (hollow) cylinder 305. The cylinders 305 may contain a hydraulic fluid on one side of the piston and air on the other side of the piston. Based on a raising or lowering event of the trunk door 304, hydraulic fluid or compressed air may be used to move the piston in the desired direction to facilitate the motion of the trunk door 304. The cylinders 305 may be coupled to the body of the vehicle via bearings 309. Each of the cylinders 305 with their respective pistons may be enclosed within a covering. One or more lift gate cylinders may be coupled to each side of the trunk door 304. As such, a first lift gate cylinder 305 may be present on the left side of the trunk door 304 and a second lift gate cylinder 305 may be present on the right side of the trunk door 304.

The gas pressure spring systems comprising the cylinders 305 and their corresponding pistons may be simultaneously operated upon activation of a switch (such as switch 260 in FIG. 2) coupled to the dashboard of the vehicle or a key fob. The switch may be used for raising or lowering the trunk door 304. In one example, raising the door 304 includes actuating a lift gate cylinder to a first position where a clearance between a lift gate piston and a cylinder head is larger responsive to a first switch position and lowering the door 304 includes actuating the lift gate cylinder to a second position where the clearance between the lift gate piston and the cylinder head is smaller responsive to a second switch position. The door 304 may be swivelably arranged on the vehicle body and dashed lines 306 show the trajectory of the door 304 during raising and lowering events.

The hose(s) 307 couple the one or more lift gate cylinders to a vent of the evaporative emissions system at a location between a fuel system canister and a canister vent valve. In one example, while actuating the one or more lift gate cylinders 305 to raise the vehicle trunk, due to the force exerted on the piston (coupled to the cylinders 304) by the compressed air present in the cylinder, the piston may move laterally in an outward direction (towards the lower end of the door) and air may be drawn from the canister of the evaporative emissions system via the vent with the canister vent valve closed to lower an evaporative emission system 302 pressure. Similarly, while actuating the one or more lift gate cylinders to lower the vehicle trunk, due to the force exerted on the piston by the hydraulic fluid within in the cylinder, the piston may move laterally in an inward direction (towards the upper end of the door) and air may be compressed into the canister via the vent with the canister vent valve closed to raise the evaporative emission system pressure.

In this way, the vehicle trunk may be raised to evacuate air from the evaporative emissions control system, and lowered to pressurize the evaporative emissions system, wherein the body element such as the trunk opens at least partially vertically, and where the opening is assisted or damped via the piston-cylinder element.

The vacuum and/or the higher pressure created by the operation of the lift gate cylinders 305 may be used for diagnostics of the evaporative emissions system. The diagnostic test may be carried out responsive to an indication that the vehicle is not occupied, and if the vehicle is occupied, the test may be delayed. During the test, the evaporative emissions control system 302 may be sealed from each of atmosphere and an engine intake manifold responsive to an indication of the vehicle hood or trunk being raised or lowered and the vacuum or higher pressure may be applied to the evaporative emissions control system components. As an example, the vacuum created in the emissions control system 302 during raising of the door 304 is monitored for a pre-determined period of time and if the bleed-up rate is lower than a threshold rate, it may be inferred that there are no undesired evaporative emissions. Similarly, a bleed-down rate of the higher emissions control system 302 pressure created during lowering of the door 304 may be monitored for a pre-determined period of time and if the rate is lower than a threshold rate, it may be inferred that there are no undesired evaporative emissions.

In this way, the systems of FIGS. 1-3 provide for a fuel system for a vehicle engine, comprising: a fuel tank, a fuel vapor canister coupled to the fuel tank via an isolation valve, a canister purge valve positioned in a purge line between the fuel vapor canister and an engine intake manifold, a canister vent valve positioned in a vent line between the fuel vapor canister and atmosphere, one or more lift gate cylinders connecting each of a hood and a trunk of the vehicle to a body of the vehicle, a sensor for receiving operator input regarding a target position of the hood and/or trunk of the vehicle, a conduit coupling the lift gate cylinder to the vent line between the fuel vapor canister and the canister vent valve, the conduit including a lift gate valve. The system may further comprise a controller for storing instructions in non-transitory memory, that when executed, cause the controller to: in response to operator input requesting vehicle hood and/or trunk opening, actuating the lift gate cylinder to open the hood or trunk, closing each of the vent valve and the purge valve, opening the lift gate valve to draw air out of the vent line until a fuel vapor system pressure is at a first pressure, and monitoring pressure bleed-up from the first pressure with the lift gate valve closed, and in response to operator input requesting vehicle hood and/or trunk closing, actuating the lift gate cylinder to close the hood or trunk, closing each of the vent valve and the purge valve, opening the lift gate valve to draw air out of the vent line until a fuel vapor system pressure is at a second pressure, higher than the first pressure, and monitoring pressure bleed-down from the second pressure with the lift gate valve closed.

Figure 4:
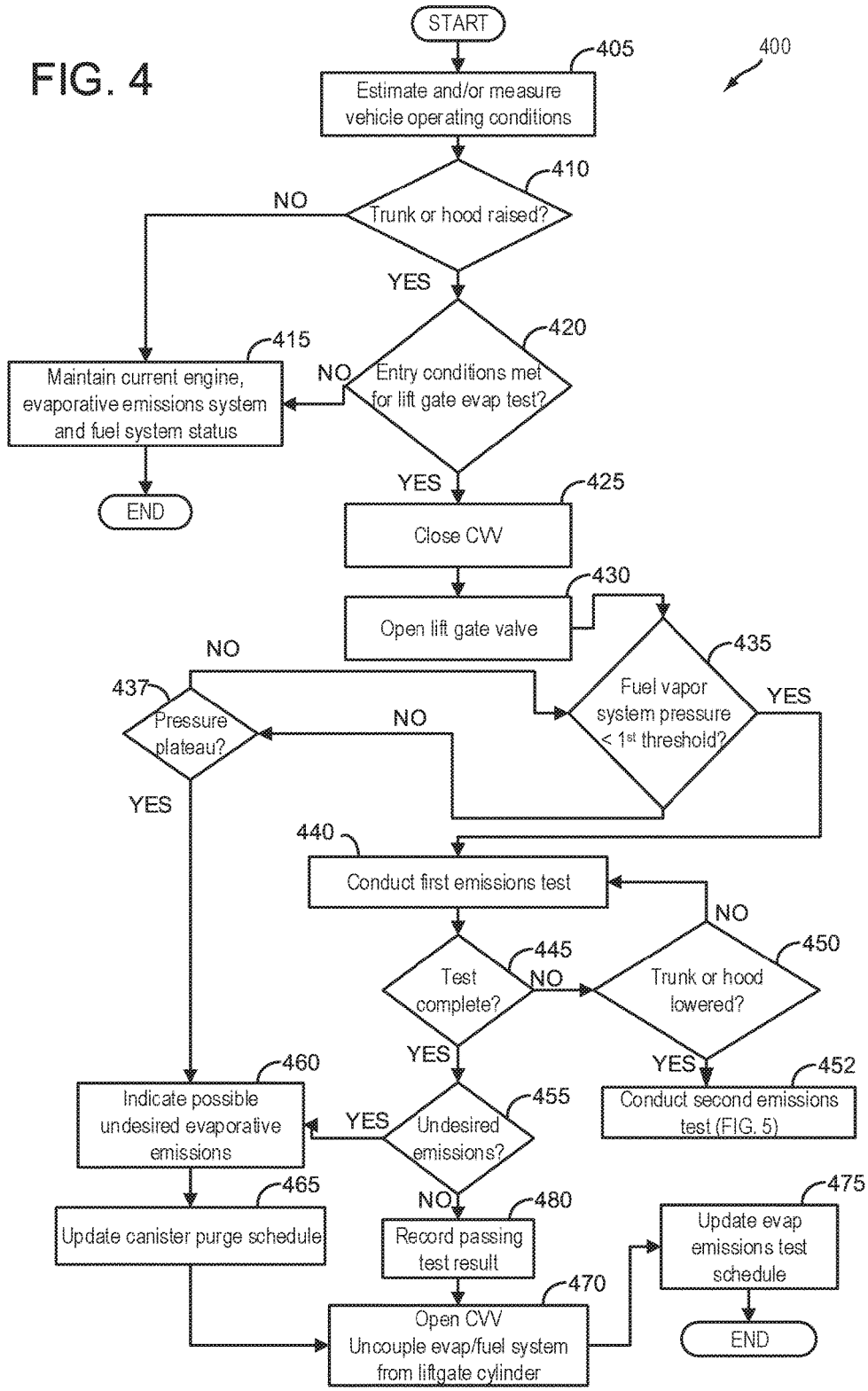
FIG. 4 shows a flow chart illustrating a method that may be implemented for conducting an evaporative emissions control system diagnostic routine during raising of a vehicle body element such as a hood or a trunk.

FIG. 4 illustrates an example method 400 for conducting an evaporative emissions system diagnostic routine during raising of a vehicle body element such as a hood or a trunk. Instructions for carrying out method 400 and the rest of the methods included herein may be executed by a controller based on instructions stored on a memory of the controller and in conjunction with signals received from sensors of the engine system, such as the sensors described above with reference to FIG. 2. The controller may employ engine actuators of the engine system to adjust engine operation according to the methods described below.

At 405, engine and vehicle operating conditions may be estimated by the controller based on inputs from a plurality of sensors. The estimated engine operating conditions may include driver demand, engine load, engine temperature, engine speed, air fuel ratio, ambient temperature, humidity, barometric pressure, etc. Vehicle conditions may include vehicle occupancy, vehicle speed, etc. Fuel system conditions, such as fuel level, fuel type, fuel temperature, etc., and various evaporative emissions system conditions, such as fuel vapor canister load, fuel tank pressure, etc., may also be determined.

At 410, the routine includes determining if the trunk or the hood of the vehicle is being raised. As an example, the raising of the trunk or hood may be initiated by the operator via actuation of a switch in the dashboard of the vehicle or via a switch in the key fob. If it is determined that the trunk or hood is not being raised, the routine may proceed to 415 and may include maintaining the current status of the engine including the evaporative emissions control system, and fuel systems. For example, the lift gate valves, the fuel system isolation valve and the canister purge valve may be maintained in a closed position and the canister vent valve may be maintained in an open position. The fuel system isolation valve may be opportunistically opened when the fuel system pressure exceeds a threshold pressure and the canister purge valve may be opened during an evaporative emissions system purge event. The diagnostic routine for the evaporative emissions system using the lift gate cylinders may not be carried out at this time.

If it is determined that one of the trunk or the hood is being raised, at 420, the routine includes determining if entry conditions for carrying out a diagnostic test of the evaporative emissions system are met. Entry conditions for an evaporative emissions diagnostic test may be met if the vehicle is not occupied, as inferred based on sensor output from a cabin occupancy sensor coupled to a vehicle passenger cabin, and/or onboard cameras. The controller may confirm that the vehicle is not occupied before initiating the diagnostic since movement of passengers inside the cabin and/or sudden opening of vehicle door may corrupt diagnostic routine results. Entry conditions being met may also include a threshold time having elapsed since a last iteration of the diagnostic routine. For example, if the time elapsed since the last iteration of the diagnostic test is lower than a threshold time, a new diagnostic test may not be desired. In still further examples, entry conditions for the diagnostic test may be considered not met if any other diagnostics tests for the evaporative emissions system, such as an engine off natural vacuum (EONV) test, is in progress. If it is determined that any of the entry conditions for carrying out a diagnostic test for the evaporative emissions system are not met, the routine may proceed to 415 wherein the current engine operating conditions may be maintained. However, in other examples, the diagnostic test may be opportunistically performed every time the trunk or hood is raised or lowered while the vehicle cabin is empty.

If it is determined that the entry conditions are met and an evaporative emissions system diagnostic test is desired, at 425, the canister vent valve (such as the valve 232 in FIG. 2) may be closed in order to seal the evaporative emissions system from the atmosphere. In addition, the canister purge valve (such as the valve 261 in FIG. 2) may be closed to isolate the fuel vapor system from the engine intake manifold. Once isolated, a diagnostic routine may be carried out in the fuel vapor system.

At 430, the lift gate valve (such as valve 253 of FIG. 2) coupling the lift gate cylinders to the vent line of the evaporative emissions system may be opened to establish a fluidic communication between the lift gate cylinders and the fuel vapor system. At this time, the second lift gate valve (such as valve 255 in FIG. 2) coupling the cylinders to the atmosphere may be closed to suspend direct communication of the cylinders to the atmosphere. During the raising of the trunk or hood, the lift gate cylinders may draw in air from the sealed fuel vapor system via the vent line. As a result, a negative pressure is generated in the fuel vapor system. The air drawn into the cylinders may be compressed in order to assist the raising motion of the hood. Due to air being drawn into the lift gate cylinders, a vacuum (lower pressure) may be created at the fuel vapor system.

At 435, the routine includes determining if the fuel vapor system pressure has decreased to below a first threshold pressure. The first threshold pressure may be a predetermined negative pressure threshold from where fuel vapor system diagnostics may be reliably performed. If it is determined that the pressure is higher than the first threshold pressure, at 437, the routine includes determining if the pressure has attained a plateau (a constant value) and is not lowering any further. In one example, if the system is not robust and there is a breach in integrity, the pressure may lower by a smaller amount and thereafter may plateau. In one example, an inability to reach the predetermined negative pressure threshold may be due to the canister vent valve being stuck in an open position. As such, undesired evaporative emissions may escape through the stuck open canister vent valve under some circumstances, such as conditions where a fuel vapor canister is loaded with fuel vapors and bleed-through emissions result. Other examples include undesired emissions stemming from a source location other than the canister vent valve in the fuel system and/or evaporative emissions system. Therefore, if it is determined that the pressure remains at a constant value (higher than the first threshold pressure) after a duration since the trunk/hood raising is initiated, at 460, it may be inferred that there is presence of possible undesired evaporative emissions from the fuel vapor system and a diagnostic code may be set indicating the situation. For example, a diagnostic code may be set to indicate that the canister vent valve may be stuck.

In response to the detection of undesirable evaporative emissions, at 465, a canister purge schedule may be updated. Updating the canister purge schedule may include scheduling canister purge operations more frequently, independent of the canister load, such that fuel vapor in the fuel system and/or evaporative emissions system may be effectively routed to the engine for combustion. In other examples, purging operations may be suspended until it is indicated that the source of undesired evaporative emissions has been mitigated. Also, in response to the indication of presence of evaporative emissions, an isolation valve coupling the canister of the evaporative emissions system to a fuel tank may be closed.

The routine may then move on to step 470, wherein the completion of the diagnostic test may be recorded and the lift gate valve may be maintained in closed position in order to uncouple the fuel vapor system from the lift gate cylinders. Also, the canister vent valve may be opened to facilitate upcoming purging routines of the evaporative emissions system. By opening the canister vent valve, the fuel vapor system may be maintained at an atmospheric pressure.

Returning to 435, if it is determined that the pressure in the fuel vapor system is lower than the first threshold pressure (that is, sufficient vacuum has been applied to the fuel vapor system), at 440, a first diagnostics test may be carried out on the fuel vapor system. To initiate the test, the lift gate valve may be closed to seal the entire fuel vapor system from the atmosphere. A rate of pressure bleed-up from the first threshold pressure may then be observed over a pre-determined period of time and the final pressure reached at the end of the time period may also be recorded. For example, a timer may be started. The change in pressure may be monitored via a pressure sensor (such as sensor 263 in FIG. 2) coupled to the evaporative emissions system.

At 445, the routine includes determining if the test has been completed. The completion of the test may be determined based on the time elapsed since the initiation of the pressure monitoring post closure of the lift gate valve. If the time elapsed is higher than the pre-determined time period during which the pressure bleed-up has been estimated (e.g., a threshold duration has elapsed on the timer), it may be inferred that the test has been completed.

If it is determined that the pre-determined period of time for the test has elapsed and that the test has completed, at 455, the routine includes determining if any undesirable emissions have been detected. Absence of evaporative emissions may be indicated responsive to a pressure bleed-up rate lower than a first predetermined threshold bleed-up rate after evacuating air from the fuel vapor system. Also, presence of undesired evaporative emissions may be indicated responsive to a final fuel vapor system pressure following the pressure bleed-up being lower than a threshold pressure. Absence of any undesired evaporative emissions may be confirmed responsive to a lower than threshold rate of pressure bleed-up and a lower than threshold final fuel vapor pressure after applying the negative pressure.

If it is determined that there is presence of undesired evaporative emissions in the fuel vapor system the routine may proceed to step 460 wherein a diagnostic code may be set indicating the presence of undesired evaporative emissions in the fuel vapor system. If it is determined that there is absence of undesired evaporative emissions in the system, at 480, it may be indicated that the fuel vapor system is robust without any undesirable evaporative emissions.

From there the routine may move on to step 470, wherein the lift gate valve and the canister vent valve may be opened. At 475, the method may include updating an evaporative emissions test schedule responsive to the indication of the presence of undesired evaporative emissions. In one example, updating the evaporative emissions test schedule may include suspending scheduled evaporative emissions tests until it is indicated that the source of undesired evaporative emissions has been addressed. In another example, updating the evaporative emissions test schedule may include scheduling evaporative emissions tests that may further isolate the source of undesired evaporative emissions. For example, if engine intake manifold vacuum was applied to both the fuel system and evaporative emissions system, a future test may be scheduled on the evaporative emissions system alone, provided that the vehicle is equipped with a fuel tank isolation valve to isolate the fuel system from the evaporative emissions system. In one example, if engine intake manifold vacuum is able to lower pressure in the evaporative emissions system to the predetermined negative pressure threshold with the fuel tank isolation valve closed, then it may be indicated that the source of undesired evaporative emissions stems from the fuel system.

If it is determined at 445 that the test has not been completed, at 450, the routine includes determining if the trunk or hood which was opened in step 410 is being lowered. If it is determined that the trunk or hood is being lowered before the ongoing test is completed, at 452, the test may be aborted and the change in pressure in the fuel vapor system may be disregarded. In response to the lowering of the trunk or hood, a second diagnostic test of the fuel vapor system may be carried out. During lowering of the hood or trunk, one or more lift gate cylinders may be actuated and air may be compressed into the canister via the lift gate valve and consequently there may be a rise in the fuel vapor system pressure. In the second diagnostic test, presence of evaporative emissions in the fuel vapor system may be indicated responsive to one or more of a final fuel vapor system pressure following a pressure bleed-down rate being lower than a predetermined threshold bleed-down rate and a final fuel vapor system pressure following the pressure bleed-down being higher than a second threshold pressure after applying positive pressure to the fuel vapor system via the lift gate cylinders. Details of the second diagnostic test of the fuel vapor system are discussed at FIG. 5.

Figure 5:
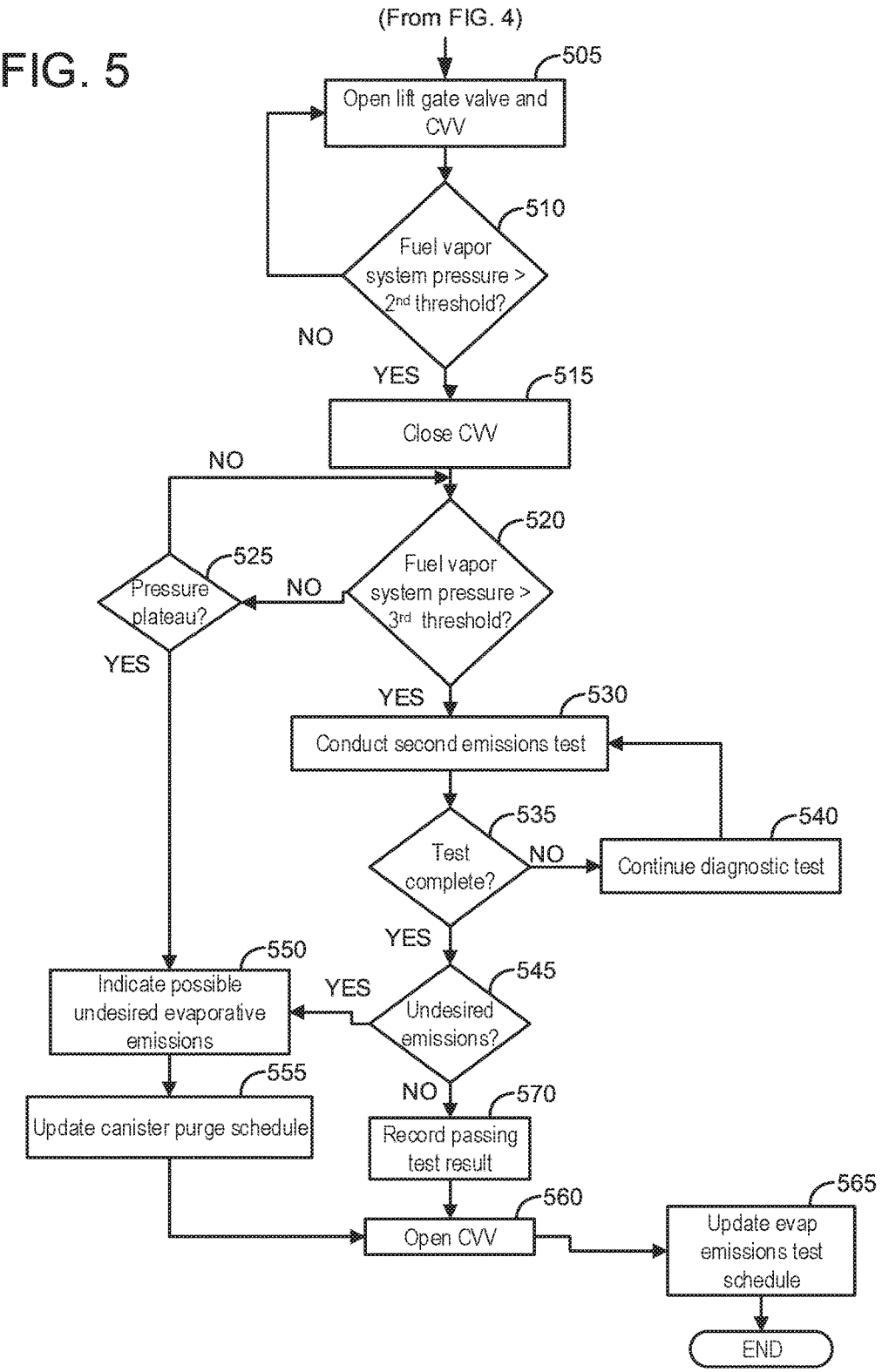
FIG. 5 shows a flow chart illustrating a method that may be implemented for conducting an evaporative emissions control system diagnostic routine during a subsequent raising of the vehicle body element.

FIG. 5 illustrates an example method 500 for conducting an evaporative emissions system diagnostic routine during lowering of the vehicle body element which was raised at step 410 of routine 400 FIG. 4. As such, routine 500 may be carried out in step 452 of routine 400 in FIG. 4.

At 505, the lift gate valve (such as valve 253 in FIG. 2) may be opened to release compressed air from the lift gate cylinders in order to assist the closing motion of the trunk or the hood. Upon opening the lift gate valve, the vacuum (lower pressure) built up in the fuel vapor system may be vented to the atmosphere. In order to assist the venting of the vacuum, the canister vent valve (such as the valve 232 in FIG. 2) may be concurrently opened in order to establish a connection between the fuel vapor system and the atmosphere. At this time, the canister purge valve may be maintained in closed position. The change in pressure in the fuel vapor system may be continually monitored.

At 510, the routine includes determining if the fuel vapor pressure is higher than a second threshold pressure. As such, the second threshold pressure may be higher than the lower pressure corresponding to the first threshold pressure (as discussed in step 435 of FIG. 4) as present in the fuel vapor system prior to the venting. The second threshold pressure may be a pressure indicative of depressurization of the fuel vapor system. For example, the second threshold pressure may be at or around ambient (barometric) pressure.

If it is determined that the fuel vapor system pressure is higher than the second pressure threshold, it may be inferred that the fuel system has been vented. In response to the completion of the depressurization process, the canister vent valve may be actuated to a closed position to reseal the fuel system from the atmosphere. The lift gate valve may be maintained in the open position in order to facilitate further release of compressed air from the lift gate cylinders. The process of opening the canister vent valve, venting the fuel vapor system vacuum, and subsequent closing of the canister vent valve may take place during the closing of the hood or the trunk. Due to closing of the canister vent valve, air compressed by the closing of the hood or trunk via the lift gate cylinders may not escape to the atmosphere via the vent line and may instead enter the fuel vapor system, thereby pressurizing the fuel vapor system. Therefore, by opening and closing the canister vent valve within a shorter time, the vacuum may be vented and a higher pressure may build up in the fuel vapor system.

At 520, the routine includes determining if the fuel vapor system pressure is higher than a third threshold pressure. The third threshold pressure may be higher than each of the first threshold pressure (as seen in step 435 in FIG. 4) and the second threshold pressure (as seen in step 510). A fuel vapor system pressure higher than the third threshold pressure may be used in a second positive pressure based diagnostic test for detection of any undesired evaporative emissions in the fuel vapor system.

If it is determined that the pressure is lower than the third threshold pressure, at 525, the routine includes determining if the pressure has attained a plateau (a constant value) and is not increasing any further. In one example, if the system is not robust, there may be a loss of pressure and consequently the pressure may not reach the third threshold pressure. Therefore, if it is determined that the pressure has plateaued at a constant pressure level (lower than the third threshold pressure) after a time period since pressurization was started, at 550, it may be inferred that there may be possible undesired evaporative emissions from the fuel vapor system and a diagnostic code may be set indicating the situation. In response to the detection of undesirable evaporative emissions, at 555, similar to step 465 in FIG. 4, a canister purge schedule may be updated. In one example, frequency of purge operations may be increased such that fuel vapor in the fuel system and/or evaporative emissions system may be effectively routed to the engine for combustion, rather than escaping to the atmosphere. In another example, purging operations may be suspended until it is indicated that the source of undesired evaporative emissions has been addressed.

The routine may then move on to step 560, wherein the completion of the second diagnostic test may be recorded and the canister vent valve may be opened to facilitate upcoming purging routines of the evaporative emissions system.

If it is determined at 520 that the pressure in the fuel vapor system is higher than the third threshold (that is, sufficient positive pressure has been applied to the fuel vapor system), at 530, a second diagnostics test may be carried out on the system. To initiate the test, the lift gate valve may be closed to decouple the fuel vapor system from the lift gate cylinders. A rate of pressure bleed-down from the third threshold pressure may then be observed over a pre-determined period of time since the closing of the lift gate valve and the final pressure reached at the end of the time period may also be recorded. For example, a timer may be started. The change in pressure may be monitored via a pressure sensor (such as sensor 263 in FIG. 2) coupled to the evaporative emissions system.

At 535, the routine includes determining if the test has been completed. The completion of the test may be determined based on the time elapsed since the initiation of the pressure monitoring. If the time elapsed is higher than the pre-determined time period during which the pressure bleed-down has been estimated (e.g., a threshold duration has elapsed on the timer) it may be inferred that the test has been completed.

If it is determined that the test has not been completed, at 540, the diagnostic test may be continued. If it is determined that the pre-determined period of time for the test has elapsed and that the test has been completed, at 545, the routine includes determining if any undesirable evaporative emissions have been detected. Absence of evaporative emissions may be inferred responsive to a pressure bleed-down rate lower than a second predetermined threshold bleed-down rate after pressurizing the fuel vapor system. Also, absence of undesired evaporative emissions may be indicated responsive to a final fuel vapor system pressure following the pressure bleed-down being higher than a threshold pressure. Presence of any undesired evaporative emissions may be confirmed responsive to a higher than threshold rate of pressure bleed-down and a lower than threshold final fuel vapor pressure after applying the positive pressure.

If it is determined that there is a presence of undesired evaporative emissions in the fuel vapor system, the routine may proceed to step 550 wherein a diagnostic code may be set indicating the presence of such emissions in the fuel vapor system. If it is determined that there is absence of undesired evaporative emissions in the system, at 570, it may be indicated that the fuel vapor system is robust without the presence of any undesirable evaporative emissions.

The routine may then move on to step 560, wherein the canister vent valve may be opened. At 565, similar to step 475 in FIG. 3, the method may include updating an evaporative emissions test schedule responsive to the indication of the presence of undesired evaporative emissions.

In this way, during a first condition, negative pressure may be applied on the fuel vapor system via the raising of a trunk or a hood of the vehicle, during a second condition, a positive pressure may be applied on the fuel vapor system via the lowering of the trunk or hood of the vehicle; and during both the first and the second condition, a test including indicating presence of evaporative emissions responsive to a change in fuel vapor system pressure may be conducted following the application of positive or negative pressure. Indicating the presence of evaporative emissions in the fuel vapor system responsive to a change in fuel vapor system pressure includes: during the first condition, indicating presence of evaporative emissions in the fuel vapor system responsive to higher than threshold rate of pressure bleed-up after applying the negative pressure and indicating absence of evaporative emissions in the fuel vapor system responsive to lower than threshold rate of pressure bleed-up after applying the negative pressure; and during the second condition, indicating the presence of evaporative emissions responsive to higher than threshold rate of pressure bleed-down after applying the positive pressure and indicating absence of evaporative emissions responsive to lower than threshold rate of pressure bleed-down after applying the positive pressure.

Figure 6:
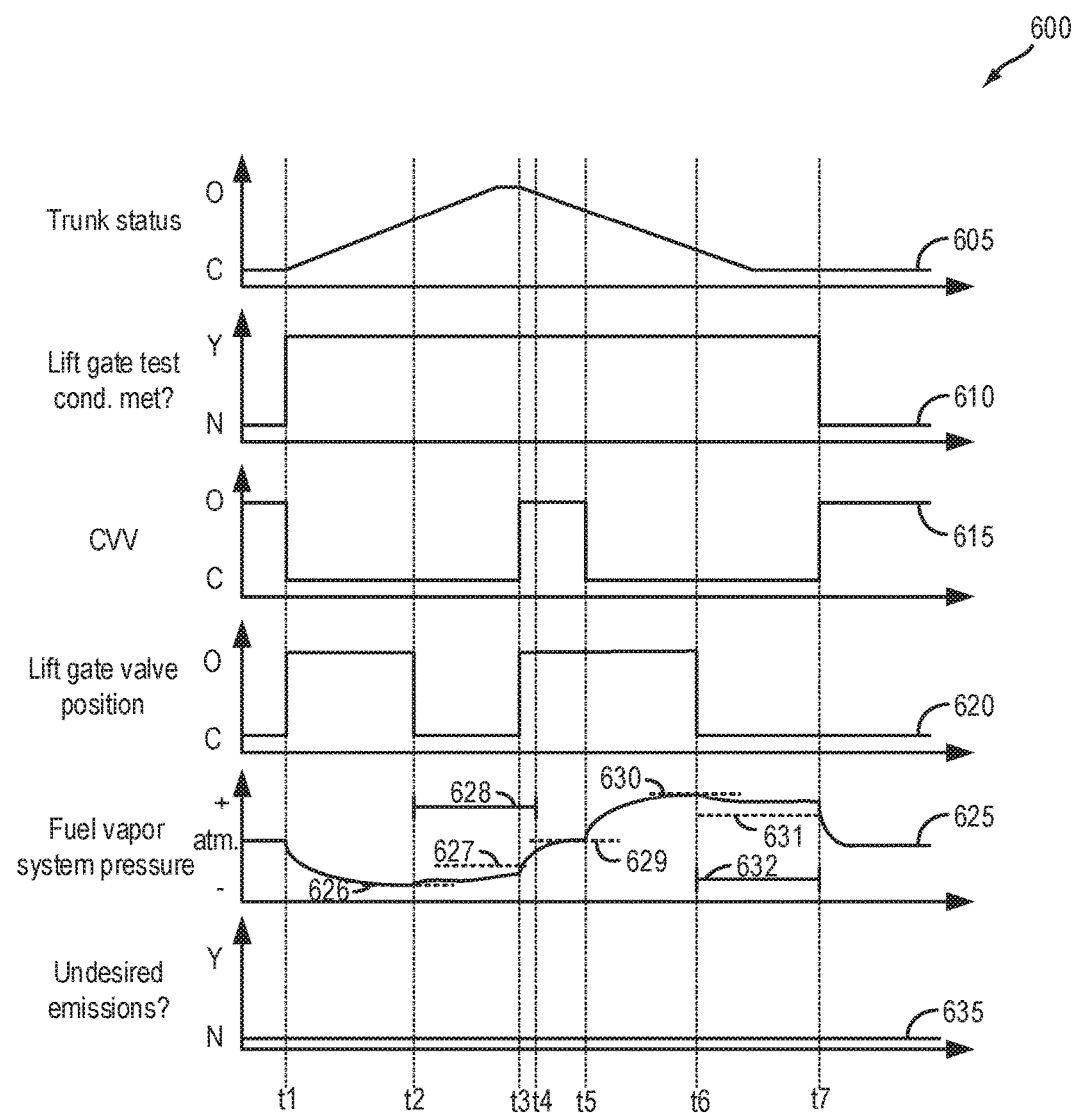
FIG. 6 shows an example evaporative emissions diagnostic routine, according to the present disclosure.

FIG. 6 shows an example operating sequence 600 illustrating a diagnostic routine of an evaporative emissions system based on pressure generated in a vehicle evaporative emissions system by raising or lowering a vehicle body element. The horizontal (x-axis) denotes time and the vertical markers t1-t7 identify significant times in the diagnostic routine.

The first plot, line 605, shows the status (open or closed) of a vehicle body element such as a trunk door. The second plot, line 610, shows if the conditions for an evaporative diagnostics test carried out using lift gate cylinders coupled to the vehicle body element are met. The third plot, line 615 shows the position of a canister vent valve (CVV) (such as valve 232 in FIG. 2) and the fourth plot, line 620, shows the position of a lift gate valve (such as valve 261 in FIG. 2). The fifth plot, line 625 shows a variation in pressure in the fuel vapor system as estimated by a pressure sensor (such as sensor 263 in FIG. 2) coupled to the evaporative emissions system. The fuel vapor system may combine the evaporative emissions system and the fuel system. The dotted lines 626, 637, 629, 630, and 631 denote a first, a second, a third, a fourth, and a fifth threshold pressure in the fuel vapor system. The line 628 denotes a first pre-determined time period for conducting a first pressure bleed-up test after application of vacuum (lower pressure) to the fuel vapor system and the line 632 denotes a second pre-determined time period for conducting a second pressure bleed-down test after application of higher pressure to the fuel vapor system. The sixth plot, line 635, shows the presence of any undesired evaporative emissions during the diagnostic routine.

Prior to time t1, the trunk door may be in lowered state with the lift gate valve in closed position and the CVV in open position. Due to the position of the valves, conditions for carrying out the evaporative diagnostics test using the lift gate cylinders may not be met and the pressure in the fuel vapor system may be maintained at atmospheric pressure. During this time, any undesirable emissions from the fuel vapor system may not be detected.

At time t1, the operator may initiate raising of the trunk door by actuating a switch. It may be confirmed by the controller that the passenger cabin is unoccupied at this time and conditions for carrying out a diagnostic routine for the evaporative emissions system are met. The conditions may further include determining if any other evaporative emissions system diagnostic test is in progress and the time elapsed since a last iteration of the test. If it determined that no other diagnostic test is in progress and the time elapsed since the last test is higher than a threshold time period, fulfillment of the conditions for a diagnostic test using the lift gate cylinders may be confirmed. In response to the initiation of the raising of the trunk door and the fulfillment of the diagnostic routine criteria, the lift gate cylinder may be opened in order to draw in air from the fuel vapor system via the vent line. The air drawn into the cylinders may be compressed in order to assist the raising motion of the hood. The CVV may be closed to isolate the fuel vapor system from the atmosphere. Also the canister purge valve coupling the evaporative emissions system to the engine intake manifold may be closed to isolate the fuel vapor system.

Between time t1 and t2, due to air being drawn out from the fuel vapor system into the cylinders, the pressure in the fuel vapor system may start reducing. At time t2, it may be determined that the pressure has reached a first threshold pressure corresponding to a lower pressure level and this lower pressure (vacuum) may be used for fuel system diagnostics. In response to the pressure reaching the first threshold pressure, a first diagnostics test of the fuel vapor system may be initiated by closing the lift gate valve and isolating the system from the lift gate cylinders. Also, a timer may be started. During the first diagnostic test, the trunk door may be raised (or be in the process of being raised) and the lift gate valve may be maintained in the closed position.

Between time t2 to t4, the trunk door is in the process of being raised (fully raised before time t3) and the increase in pressure (bleed-up) in the fuel vapor system may be continuously monitored. In order to complete the diagnostic routine, the bleed-up may be monitored (using the timer) for a pre-defined time period as shown by line 628, and if at the end of the time period (at time t4), the final pressure is below the second threshold pressure 627, it may be inferred that there are no undesired evaporative emissions in the system. However at time t3, before the completion of the pre-determined time period, the operator may initiate lowering of the trunk door. In response to the initiation of the lowering of the trunk door, the lift gate valve may actuated to open position in order to vent the compressed air in the lift gate cylinders. As a consequence, the first diagnostic routine may be aborted before completion. In order to vent the lower pressure (vacuum) in the fuel vapor system, the CVV may be opened.

Between time t3 and t5, the CVV and the lift gate valve may be maintained in open positions, and the pressure in the fuel vapor system may consequently increase. Once the pressure increases to the third threshold pressure level, at time t5, it may be inferred that no further venting of the lower pressure is desired for the fuel vapor system and consequently the CVV may be closed.

Upon closing the CVV, between time t5 and t6, while the trunk door may be still in the process of being lowered, the compressed air from the lift gate cylinders may be routed to the fuel vapor system, thereby increasing the pressure in the system. At time t6, it may be inferred that the pressure in the fuel vapor system has increased to a third threshold pressure (that is, sufficient positive pressure has been applied to the fuel vapor system). In response to the pressure reaching the third threshold pressure, the second diagnostics test of the fuel vapor system may be initiated by closing the lift gate valve and isolating the system from the lift gate cylinders. Also, a timer may be initiated. During the second diagnostic test, the trunk door may be lowered and the lift gate valve may be maintained in the closed position.

Between time t6 and t7, the decrease in pressure (bleed-down) in the fuel vapor system may be continuously monitored (using the timer). In order to complete the diagnostic routine, the bleed-down of the positive pressure may be monitored for a pre-defined time period as shown by line 632, and if at the end of the time period (at time t7), the final pressure is above the fifth threshold pressure 631, it may be inferred that there are no undesired evaporative emissions in the system. At time t7, at the end of the pre-defined time period, the timer may be stopped and the diagnostic routine may be completed. In response to the final pressure being higher than the fifth threshold pressure 631, absence of any undesirable evaporative emissions may be confirmed. Upon completion of the diagnostic routine, the CVV may be actuated to open position for further operation of the evaporative emissions system. After time t7, the trunk door and the lift gate valve may be maintained in closed positions and conditions for carrying out the diagnostics routine for the fuel vapor system using lift gate cylinders may no longer be satisfied.

In this way, the above mentioned example of diagnostic test for detection of undesired evaporative emissions may be conducted in a first condition during raising of the trunk; and responsive to an indication that the test cannot be completed; the test for undesired evaporative emissions may be conducted in the second condition during lowering of the trunk, wherein the indication that the test cannot be completed includes the trunk being lowered prior to completion of the test for undesired evaporative emissions. It will be appreciated that in alternate examples, the same approach may be used during the raising and lowering of a hood.

One example method comprises adjusting pressure in a vehicle evaporative emissions system by raising or lowering a vehicle body element; and conducting a test in the evaporative emissions control system for detection of evaporative emissions based on the adjusted pressure. In the preceding example, additionally or optionally, the adjusting includes raising the vehicle hood or trunk to evacuate air from the evaporative emissions control system, and wherein the body element opens at least partially vertically, and where the opening is assisted or damped via a piston-cylinder element. In any or all of the preceding examples, additionally or optionally, the adjusting includes lowering the vehicle hood or trunk to pressurize the evaporative emissions control system. In any or all of the preceding examples, additionally or optionally, the adjusting includes lowering the vehicle hood or trunk to pressurize the evaporative emissions control system. Any or all of the preceding examples further comprises, additionally or optionally, sealing the evaporative emissions control system from each of atmosphere and an engine intake manifold responsive to an indication of the vehicle hood or trunk being raised or lowered. Any or all of the preceding examples further comprises, additionally or optionally, prior to the sealing, depressurizing the evaporative emissions control system and conducting the test responsive to an indication that the vehicle is not occupied; and if the vehicle is occupied, delaying conducting the test. In any or all of the preceding examples, additionally or optionally, raising or lowering the vehicle hood or trunk includes actuating one or more lift gate cylinders, the one or more lift gate cylinders coupling a body of the vehicle to the vehicle hood or trunk, the one or more lift gate cylinders further coupled to the evaporative emissions system via a hose. In any or all of the preceding examples, additionally or optionally, the hose couples the one or more lift gate cylinders to a vent of the evaporative emissions system at a location between a fuel system canister and a canister vent valve, and wherein adjusting the pressure includes: while actuating the one or more lift gate cylinders to raise the vehicle hood or trunk, drawing air from the canister via the vent with the canister vent valve closed to lower an evaporative emission system pressure; and while actuating the one or more lift gate cylinders to lower the vehicle hood or trunk, compressing air into the canister via the vent with the canister vent valve closed to raise the evaporative emission system pressure. In any or all of the preceding examples, additionally or optionally, indicating no evaporative emissions responsive to a pressure bleed-up rate lower than a first predetermined threshold bleed-up rate after evacuating air from the evaporative emissions system; and indicating no evaporative emissions responsive to a pressure bleed-down rate lower than a second predetermined threshold bleed-down rate after pressurizing the evaporative emissions system.

Another example method for a fuel vapor system of a vehicle, comprises: during a first condition, applying negative pressure on the fuel vapor system via the raising of a trunk or a hood of the vehicle; during a second condition, applying positive pressure on the fuel vapor system via the lowering of the trunk or hood of the vehicle; and during both the first and the second condition, conducting a test including indicating presence of evaporative emissions responsive to a change in fuel vapor system pressure following the applying of positive or negative pressure. In the preceding example, additionally or optionally, the fuel vapor system includes a fuel vapor canister coupled to atmosphere via a vent line having a vent valve, the canister coupled to an engine intake manifold via a purge line having a purge valve, the method further comprising, during both the first and second conditions, responsive to an indication that the trunk or hood is being raised or lowered, sealing the fuel vapor system from the atmosphere by closing the vent valve and the purge valve. In any or all of the preceding examples, additionally or optionally, raising the vehicle hood or trunk includes actuating a lift gate cylinder to a first position where a clearance between a lift gate piston and a cylinder head is larger, and wherein lowering the vehicle hood or trunk includes actuating the lift gate cylinder to a second position where the clearance between the lift gate piston and the cylinder head is smaller, wherein the lift gate piston is coupled to the vent line of the fuel vapor system, between the canister and the vent valve, via a hose. In any or all of the preceding examples, additionally or optionally, applying negative pressure on the fuel vapor system via the raising during the first condition includes drawing air out of the vent line while actuating the lift gate cylinder to the first position, and wherein applying positive pressure on the fuel vapor system via the lowering during the second condition includes forcing air into the vent line while actuating the lift gate cylinder to the second position. In any or all of the preceding examples, during both the first and the second condition, additionally or optionally, the vehicle is unoccupied. In any or all of the preceding examples, additionally or optionally, indicating the presence of evaporative emissions in the fuel vapor system responsive to a change in fuel vapor system pressure includes: during the first condition, indicating presence of evaporative emissions in the fuel vapor system responsive to higher than threshold rate of pressure bleed-up after applying the negative pressure and indicating absence of evaporative emissions in the fuel vapor system responsive to lower than threshold rate of pressure bleed-up after applying the negative pressure; and during the second condition, indicating the presence of evaporative emissions responsive to higher than threshold rate of pressure bleed-down after applying the positive pressure and indicating absence of evaporative emissions responsive to lower than threshold rate of pressure bleed-down after applying the positive pressure. Any or all of the preceding examples further comprises, additionally or optionally, in response to the indication of presence of evaporative emissions, closing an isolation valve coupling the canister to a fuel tank. Any or all of the preceding examples further comprises, additionally or optionally, in response to the trunk or hood being lowered before the conducting test is completed during the first condition, aborting the test and disregarding the change in fuel system pressure; and in response to the trunk or hood being raised before the conducting test is completed during the second condition, aborting the test and disregarding the change in fuel system pressure. Any or all of the preceding examples further comprises, additionally or optionally, conducting the test for undesired evaporative emissions in the first condition; and responsive to an indication of undesired evaporative emissions, not conducting the test in the second condition. Any or all of the preceding examples further comprises, additionally or optionally, conducting the test for undesired evaporative emissions in the first condition; and responsive to an indication that the test cannot be completed; conducting the test for undesired evaporative emissions in the second condition: wherein the indication that the test cannot be completed includes the trunk or hood being lowered prior to completion of the test for undesired evaporative emissions.

In yet another example a fuel system for a vehicle engine, comprising: a fuel tank, a fuel vapor canister coupled to the fuel tank via an isolation valve, a canister purge valve positioned in a purge line between the fuel vapor canister and an engine intake manifold, a canister vent valve positioned in a vent line between the fuel vapor canister and atmosphere, one or more lift gate cylinders connecting each of a hood and a trunk of the vehicle to a body of the vehicle, a sensor for receiving operator input regarding a target position of the hood and/or trunk of the vehicle, a conduit coupling the lift gate cylinder to the vent line between the fuel vapor canister and the canister vent valve, the conduit including a lift gate valve, and a controller storing instructions in non-transitory memory, that when executed, cause the controller to: in response to operator input requesting vehicle hood and/or trunk opening, actuating the lift gate cylinder to open the hood or trunk, closing each of the vent valve and the purge valve, opening the lift gate valve to draw air out of the vent line until a fuel vapor system pressure is at a first pressure, and monitoring pressure bleed-up from the first pressure with the lift gate valve closed, and in response to operator input requesting vehicle hood and/or trunk closing, actuating the lift gate cylinder to close the hood or trunk, closing each of the vent valve and the purge valve, opening the lift gate valve to draw air out of the vent line until a fuel vapor system pressure is at a second pressure, higher than the first pressure, and monitoring pressure bleed-down from the second pressure with the lift gate valve closed. The preceding example further comprises, additionally or optionally, one or more occupancy sensors coupled to a vehicle cabin indicative of vehicle occupancy, wherein the operator input requesting vehicle hood and/or trunk opening and closing is received while the vehicle is unoccupied. In any or all of the preceding examples, additionally or optionally, the controller includes further instructions for: indicating a presence of evaporative emissions in the fuel vapor system responsive one or more of a monitored rate of pressure bleed-up from the first pressure being higher than a threshold rate and a monitored rate of pressure bleed-down from the second pressure being higher than the threshold rate. In any or all of the preceding examples, additionally or optionally, the controller includes further instructions for: indicating the presence of evaporative emissions in the fuel vapor system responsive to one or more of a final fuel vapor system pressure following the pressure bleed-up being lower than a first threshold pressure and the final fuel vapor system pressure following the pressure bleed-down being higher than a second threshold pressure.

In this way, by adjusting fuel vapor system pressure (vacuum and/or higher pressure) generated by piston-cylinders present in a vehicle hood or trunk, detection of undesired emissions in the evaporative emissions control system may be opportunistically carried out without dependence on factors such as temperature and without the requirement of any additional component such as an evaporative emissions system pump. Due to short duration of the pressure adjustment and consequent diagnostics test, a larger number of diagnostics tests may be carried out within a drive cycle, improving the completion ratio for the evaporative emissions control system monitoring. The technical effect of using a lift gate cylinder for evaporative emissions control system diagnostic test is that the test may be carried out both during opening of the hood or trunk using the vacuum generated in the process and during closing of the hood or trunk using the higher pressure generated in the process. By employing a short and effective diagnostics method for evaporative emissions control system using lift gate cylinders, emissions compliance may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
adjusting pressure in a vehicle evaporative emissions system by raising or lowering a vehicle body element; and
conducting a test in the evaporative emissions system for detection of evaporative emissions based on the adjusted pressure,
wherein the vehicle body element includes a hood, a trunk, and/or a door.

2. The method of claim 1, wherein the adjusting includes raising one or more of the hood, the trunk, and the door to evacuate air from the evaporative emissions system, and wherein the vehicle body element opens at least partially vertically, and where the opening is assisted or damped via a piston-cylinder element.

3. The method of claim 2, wherein the adjusting includes lowering one or more of the hood, the trunk, and the door to pressurize the evaporative emissions system.

4. The method of claim 3, further comprising:
indicating no evaporative emissions responsive to a pressure bleed-up rate lower than a first predetermined threshold bleed-up rate after evacuating air from the evaporative emissions system; and
indicating no evaporative emissions responsive to a pressure bleed-down rate lower than a second predetermined threshold bleed-down rate after pressurizing the evaporative emissions system.

5. The method of claim 3, wherein raising or lowering one or more of the hood, the trunk, and the door includes actuating one or more lift gate cylinders, the one or more lift gate cylinders coupling a body of a vehicle to one or more of the hood, the trunk, and the door, the one or more lift gate cylinders further coupled to the evaporative emissions system via a hose.

6. The method of claim 5, wherein the hose couples the one or more lift gate cylinders to a vent of the evaporative emissions system at a location between a fuel system canister and a canister vent valve, and wherein adjusting the pressure includes:
- while actuating the one or more lift gate cylinders to raise one or more of the hood, the trunk, and the door, drawing air from the fuel system canister via the vent with the canister vent valve closed to lower an evaporative emissions system pressure; and
- while actuating the one or more lift gate cylinders to lower one or more of the hood, the trunk, and the door, compressing air into the fuel system canister via the vent with the canister vent valve closed to raise the evaporative emissions system pressure.

7. The method of claim 1, further comprising:
sealing the evaporative emissions system from each of atmosphere and an engine intake manifold responsive to an indication of one or more of the hood, the trunk, and the door being raised or lowered.

8. The method of claim 7, further comprising:
prior to the sealing, depressurizing the evaporative emissions system and conducting the test responsive to an indication that a vehicle is not occupied; and if the vehicle is occupied, delaying conducting the test.

9. A method for a fuel vapor system of a vehicle, comprising:
- during a first condition, applying negative pressure on the fuel vapor system via the raising of a trunk or a hood of the vehicle;
- during a second condition, applying positive pressure on the fuel vapor system via the lowering of the trunk or hood of the vehicle; and
- during both the first and the second condition, conducting a test including indicating presence of evaporative emissions responsive to a change in fuel vapor system pressure following the applying of positive or negative pressure.

10. The method of claim 9, wherein during both the first and the second condition, the vehicle is unoccupied.

11. The method of claim 9, wherein indicating the presence of evaporative emissions in the fuel vapor system responsive to the change in fuel vapor system pressure includes:
- during the first condition, indicating presence of evaporative emissions in the fuel vapor system responsive to higher than threshold rate of pressure bleed-up after applying the negative pressure and indicating absence of evaporative emissions in the fuel vapor system responsive to lower than threshold rate of pressure bleed-up after applying the negative pressure; and
- during the second condition, indicating the presence of evaporative emissions responsive to higher than threshold rate of pressure bleed-down after applying the positive pressure and indicating absence of evaporative emissions responsive to lower than threshold rate of pressure bleed-down after applying the positive pressure.

12. The method of claim 9, further comprising:
- in response to the trunk or hood being lowered before the conducting test is completed during the first condition, aborting the test and disregarding the change in fuel system pressure; and
- in response to the trunk or hood being raised before the test is completed during the second condition, aborting the test and disregarding the change in fuel system pressure.

13. The method of claim 9, wherein the fuel vapor system includes a fuel vapor canister coupled to atmosphere via a vent line having a vent valve, the canister coupled to an engine intake manifold via a purge line having a purge valve, the method further comprising, during both the first and second conditions, responsive to an indication that the trunk or hood is being raised or lowered, sealing the fuel vapor system from the atmosphere by closing the vent valve and the purge valve.

14. The method of claim 13, further comprising, in response to the indication of presence of evaporative emissions, closing an isolation valve coupling the canister to a fuel tank.

15. The method of claim 13, wherein raising the vehicle hood or trunk includes actuating a lift gate cylinder to a first position where a clearance between a lift gate piston and a cylinder head is larger, and wherein lowering the vehicle hood or trunk includes actuating the lift gate cylinder to a second position where the clearance between the lift gate piston and the cylinder head is smaller, wherein the lift gate piston is coupled to the vent line of the fuel vapor system, between the canister and the vent valve, via a hose.

16. The method of claim 15, wherein applying negative pressure on the fuel vapor system via the raising during the first condition includes drawing air out of the vent line while actuating the lift gate cylinder to the first position, and wherein applying positive pressure on the fuel vapor system via the lowering during the second condition includes forcing air into the vent line while actuating the lift gate cylinder to the second position.

17. A fuel system for a vehicle engine, comprising:
- a fuel tank;
- a fuel vapor canister coupled to the fuel tank via an isolation valve;
- a canister purge valve positioned in a purge line between the fuel vapor canister and an engine intake manifold;
- a canister vent valve positioned in a vent line between the fuel vapor canister and atmosphere;
- one or more lift gate cylinders connecting each of a hood and a trunk of a vehicle to a body of the vehicle;
- a sensor for receiving operator input regarding a target position of the hood and/or the trunk of the vehicle;
- a conduit coupling the lift gate cylinders to the vent line between the fuel vapor canister and the canister vent valve, the conduit including a lift gate valve; and
- a controller storing instructions in non-transitory memory that, when executed, cause the controller to:
  - in response to operator input requesting the hood and/or the vehicle trunk opening, actuating the lift gate cylinder to open the hood or trunk;
  - closing each of the vent valve and the purge valve;
  - opening the lift gate valve to draw air out of the vent line until a fuel vapor system pressure is at a first pressure; and
  - monitoring pressure bleed-up from the first pressure with the lift gate valve closed; and
  - in response to operator input requesting the hood and/or the vehicle trunk closing, actuating the lift gate cylinder to close the hood or the vehicle trunk;
  - closing each of the vent valve and the purge valve;
  - opening the lift gate valve to draw air out of the vent line until the fuel vapor system pressure is at a second pressure, higher than the first pressure; and
  - monitoring pressure bleed-down from the second pressure with the lift gate valve closed.

18. The system of claim 17, further comprising one or more occupancy sensors coupled to a vehicle cabin indicative of vehicle occupancy, wherein the operator input requesting the hood and/or the vehicle trunk opening and closing is received while the vehicle is unoccupied.

19. The system of claim 17, wherein the controller includes further instructions for:
   indicating a presence of evaporative emissions in the fuel vapor system responsive to one or more of a monitored rate of pressure bleed-up from the first pressure being higher than a threshold rate and a monitored rate of pressure bleed-down from the second pressure being higher than the threshold rate.

20. The system of claim 17, wherein the controller includes further instructions for:
   indicating presence of evaporative emissions in the fuel vapor system responsive to one or more of a final fuel vapor system pressure following the pressure bleed-up being lower than a first threshold pressure and the final fuel vapor system pressure following the pressure bleed-down being higher than a second threshold pressure.

* * * * *